United States Patent
Murphy

(10) Patent No.: US 11,452,399 B1
(45) Date of Patent: Sep. 27, 2022

(54) FRUIT INFUSER SYSTEM FOR BEVERAGE BOTTLE

(71) Applicant: Michael O. Murphy, Sour Lake, TX (US)

(72) Inventor: Michael O. Murphy, Sour Lake, TX (US)

( * ) Notice: Subject to any disclaimer, the term of this patent is extended or adjusted under 35 U.S.C. 154(b) by 0 days.

(21) Appl. No.: 16/808,537

(22) Filed: Mar. 4, 2020

Related U.S. Application Data

(60) Provisional application No. 62/983,743, filed on Mar. 1, 2020.

(51) Int. Cl.
| | |
|---|---|
| *A47J 19/00* | (2006.01) |
| *A47J 43/20* | (2006.01) |
| *B01D 29/00* | (2006.01) |
| *B65D 1/02* | (2006.01) |
| *A47J 43/28* | (2006.01) |
| *A23L 2/04* | (2006.01) |
| *B65D 43/02* | (2006.01) |
| *B01D 29/15* | (2006.01) |
| *A23L 2/56* | (2006.01) |

(52) U.S. Cl.
CPC ............ *A47J 19/005* (2013.01); *A23L 2/04* (2013.01); *A23L 2/56* (2013.01); *A47J 43/284* (2013.01); *B01D 29/15* (2013.01); *B65D 1/0246* (2013.01); *B65D 43/0231* (2013.01); *A23V 2002/00* (2013.01)

(58) Field of Classification Search
CPC ...... A47J 19/005; A47J 43/284; A47J 31/605; A47J 31/446; A47J 31/20; A23L 2/04; A23L 2/06; A23L 2/56; B01D 29/15; B01D 36/02; B65D 1/0246; B65D 43/0231
See application file for complete search history.

(56) References Cited

U.S. PATENT DOCUMENTS

| | | | | |
|---|---|---|---|---|
| 2,055,096 | A * | 9/1936 | Dehn | C02F 1/003 210/466 |
| 4,717,016 | A * | 1/1988 | Dalgleish | A01G 25/06 206/0.5 |
| 4,821,630 | A * | 4/1989 | Roberts | A47G 19/14 206/0.5 |
| 7,810,651 | B2 | 10/2010 | Miga, Jr. | |
| 10,272,371 | B2 | 4/2019 | Lombardo et al. | |
| 2005/0263006 | A1 * | 12/2005 | Saha | A47J 31/0615 99/275 |
| 2008/0302754 | A1 * | 12/2008 | Lewin | A47G 19/2266 215/229 |
| 2012/0055862 | A1 | 3/2012 | Parech et al. | |

(Continued)

OTHER PUBLICATIONS

Hydracy Fruit Infuser, Amazon.com.

*Primary Examiner* — Ericson M Lachica
(74) *Attorney, Agent, or Firm* — John R. Casperon

(57) ABSTRACT

To make a flavored beverage, plant matter is inserted into a bottle through the neck of the bottle. Afterwards, a generally tubular strainer is inserted into the bottle. The tubular strainer has a flange that sealingly abuts against the neck of the bottle. The bottle is filled with a water-based liquid and capped. By inserting the plant matter before the strainer, the plant matter is trapped between the strainer and the bottle wall, making it visible from the outside if the bottle is clear. The strainer prevents the plant matter from being ingested by the user.

8 Claims, 2 Drawing Sheets

(56) References Cited

U.S. PATENT DOCUMENTS

| | | | |
|---|---|---|---|
| 2012/0118848 A1* | 5/2012 | Hendrickson | B65D 21/0204 |
| | | | 215/40 |
| 2013/0199989 A1* | 8/2013 | Carter | A47G 19/2266 |
| | | | 210/464 |
| 2013/0264262 A1* | 10/2013 | Closi, Jr. | C02F 1/002 |
| | | | 210/198.1 |
| 2014/0224725 A1* | 8/2014 | Uspenski | A47J 31/005 |
| | | | 210/444 |
| 2014/0251153 A1* | 9/2014 | Tien | A47J 31/4407 |
| | | | 99/322 |
| 2015/0230651 A1* | 8/2015 | Molayem | A47J 31/0636 |
| | | | 99/322 |
| 2016/0075477 A1* | 3/2016 | Halioua | A47J 31/446 |
| | | | 222/566 |
| 2016/0198905 A1* | 7/2016 | Casey | A47J 43/27 |
| | | | 366/130 |
| 2017/0136204 A1* | 5/2017 | Steiert | A61M 16/0666 |
| 2019/0002152 A1* | 1/2019 | Chivrac | B65D 1/0223 |
| 2020/0216245 A1* | 7/2020 | Coules | B65D 71/066 |

* cited by examiner

FRUIT INFUSER SYSTEM FOR BEVERAGE BOTTLE

FIELD OF THE INVENTION

In one embodiment, this invention relates to bottled beverages that have been infused with extracts from plant materials.

In another embodiment, this invention relates to an infuser system that can be used to infuse flavors into a beverage.

In a further embodiment, this invention relates to a method for making beverages that have been infused with extracts from plant materials.

BACKGROUND OF THE INVENTION

Beverage presentation and taste can be improved by the addition of visible materials from plants. For example, iced tea looks and tastes better with fresh lemon and mint.

However, off-the-shelf beverages don't contain these materials. There isn't space in local convenience store coolers occupied by beverages containing visible pieces of fruits, vegetables, herbs or spices.

The beverage industry may be "Missing the Boat" by not being able to add entirely or almost-entirely non-processed organic flavors to their product. Plus, the mixed product can be more attractive to the eye of the consumer. Imagine a fruity, spiced or herbed drink as something you could see in your local convenience stores cooler between the bottled water and sports drinks.

Fruit infused beverage is an increasingly popular refreshment. However, the bottles used to contain the infused liquid are typically bulky and don't fit well in cup holders. A system that could be used to provide fruit infused beverage in a sleek bottle that fits a cup holder would be very desirable.

A popular size for a cupholder-sized disposable plastic water bottle is 0.5 liters (16.9 fluid oz), such bottle having a neck ID is of about 0.85 inches (21.6 mm). A popular size for sports drinks in a cupholder sized disposable plastic bottles is 20 fluid oz (591 ml), such bottles having a neck ID of about 1.28 inches (32.5 mm). It would be desirable to provide a fruit infuser system for such bottles so that they could be recycled and so that they would be convenience store racks currently in use.

Although the invention is not limited to cupholder sized bottles, it is expected to provide good benefits when used in conjunction with such sized bottles.

OBJECTS OF THE INVENTION

It is an object of this invention to provide beverages containing visible pieces of fruits, vegetables, herbs or spices.

It is another object of this invention to provide a device that separates the solids from the liquids in a beverage for safety's sake.

It is a further object of this invention to provide an infuser system to add natural flavors to a beverage that is especially useful with cupholder sized bottles.

SUMMARY OF THE INVENTION

One embodiment of the invention provides a method for preparing a plant matter flavored beverage for later consumption. The method is carried out by inserting plant matter into a bottle through the neck of the bottle. Afterwards, a generally tubular strainer is inserted into the bottle. The tubular strainer has a flange that sealingly abuts against the neck of the bottle. The bottle is filled with a water-based liquid and capped.

By inserting the plant matter before the strainer, the plant matter is trapped between the strainer and the bottle wall, making it visible from the outside if the bottle is clear. The strainer prevents the plant matter from being ingested by the user.

As examples, the beverage could be tea with lemon and/or mint, or lemonade with lemon.

Another embodiment of the invention provides a bottle/beverage assembly that can be made by the just-described method. The assembly comprises a plastic bottle, an insert, and a mixture of beverage and plant matter, and a solution of beverage and plant matter extract. The bottle preferably has a volume in the range of 0.4 L to 0.8 L. The bottle defines a neck having an inside diameter in the range of 20 to 35 mm. The neck terminates in an annular sealing surface. The bottle has a main body of larger inside diameter than the neck. The insert extends into the bottle through the neck. The insert has a tubular imperforate section positioned in the neck of the bottle and a porous section positioned in the main body of the bottle. The insert defines an annular flange on an exterior of the imperforate section sealingly positioned against the annular sealing surface of the bottle. A chamber of annular cross section is defined between the porous section of the insert and the main body of the bottle. A mixture of beverage and plant matter is located in the chamber, and a solution of beverage and plant matter extracts from the plant matter is located in the insert.

Disposable clear plastic bottles of the described size are in common use and are sized to fit in cup holders of automobiles and chairs as well as in racks at convenience stores. The invention provides a new application for those bottles as well as an avenue for recycling them for home use.

Another embodiment of the invention provides an elongated filter insert for a bottle that can be used in the combination above described. The elongated insert has a first end, a second end, and a longitudinal axis extending between the first end and the second end. The elongated insert has a hollow inside and an axially directed opening at the first end communicating with the hollow inside. The bottle insert has a porous section establishing a multiplicity of lateral flow paths into the hollow and an imperforate section between the porous section and the first end. The porous section is diametrically expandable to a larger diameter than the imperforate section, preferably by relaxing after it has been inserted through the bottle neck.

DETAILED DESCRIPTION OF THE INVENTION

Figure 1:
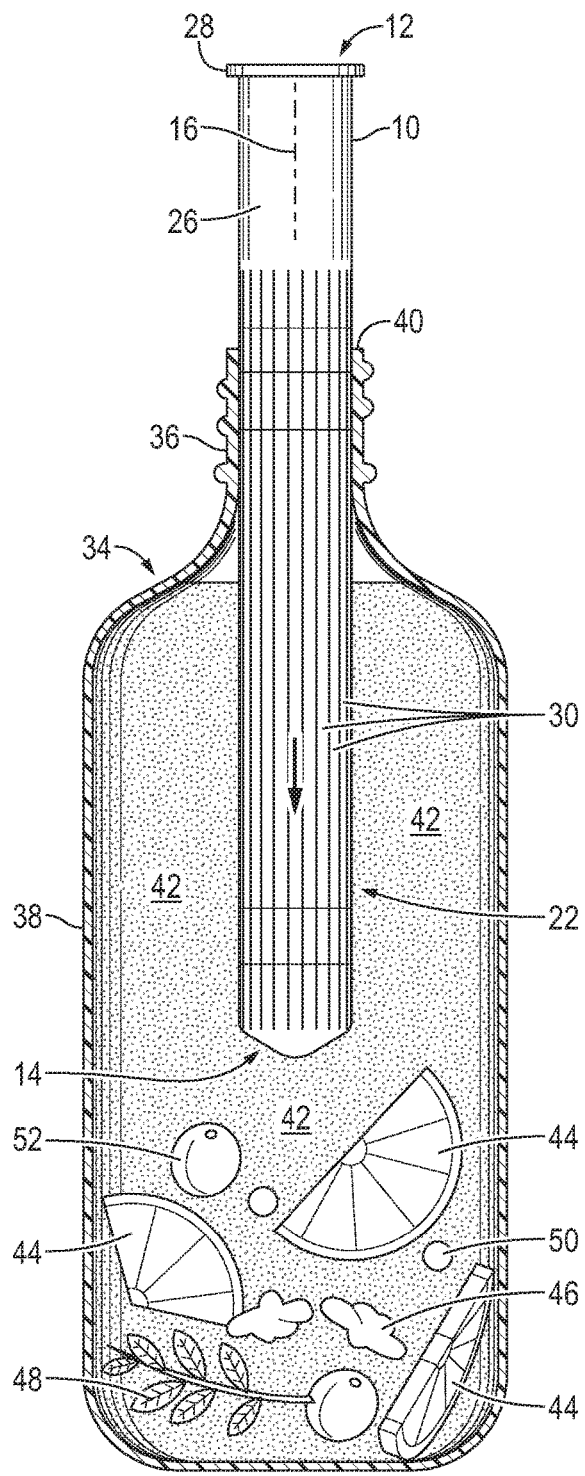
FIG. 1 is a partial cross-sectional view illustrating an early stage of forming an embodiment of the invention.
Figure 2:
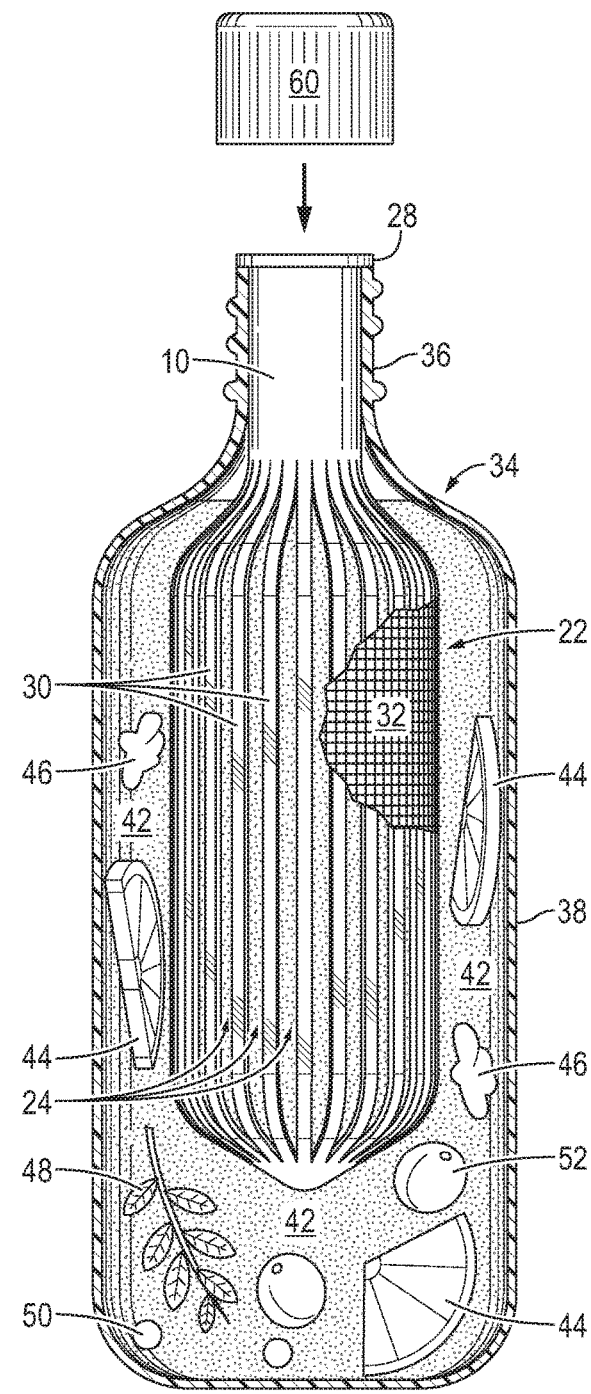
FIG. 2 is a partial cross-sectional view of the embodiment of the invention shown in FIG. 1 at a later stage of making.

One embodiment of the invention provides an elongated filter insert 10, 110, for a bottle. The elongated insert 10 has a first end 12, a second end 14, and a longitudinal axis 16 extending between the first end and the second end. The elongated insert has a hollow inside 18 and an axially directed opening 20 at the first end communicating with the hollow inside. The bottle insert has a porous section 22 establishing a multiplicity of lateral flow paths 24 into the hollow and an imperforate section 26 between the porous section and the first end. The porous section is diametrically expandable to a larger diameter than the imperforate section, preferably by relaxing after it has been inserted through the bottle neck.

Generally speaking, the porous section relaxes to a diameter in the range of 1.1 to 5 times the diameter of the imperforate section, preferably in the range of 1.5 to 3 times the diameter of the imperforate section. The porous section has a length as measured along the longitudinal axis that is in the range of 1 to 10 times the length of the nonporous section, preferably in the range of 2 to 6 times of the length of the nonporous section.

The imperforate section of the insert is generally tubular and defines a radially outward extending annular flange 28. The outside diameter of the imperforate section is preferably determined by the inside diameter of the neck of the bottle in which it is used, for a snug fit.

In the illustrated embodiment, the porous section comprises a multiplicity of ribs 30 extending generally alongside each other. The lateral flow paths are defined between the ribs. Generally speaking, the lateral flow paths prevent passage of particles, for example, fruit or vegetable chunks, that are greater than minimum cross-section size of ¼ inch. If desired, the lateral flow paths can prevent passage of particles of greater than a minimum cross section size of ¹⁄₄₀ inch, for example, tea leaves or coarse spices. The insert is preferably molded in its desired end form from a plastic that will permit the bulbous end to be temporarily collapsed and slid through the neck of the bottle. In the illustrated embodiment, the porous section expands to a generally prolate spheroid (football) or cylindrical spheroid (generally cylindrical with hemispherical end caps) shape.

Preferably and as illustrated, the ribs each have a longitudinally extending component. More preferably, the ribs extend generally longitudinally. However, if needed, cross ribbing could be provided, or collapsible or expandable rings place interiorly of the ribs. Also, for some applications, it may be necessary to mechanically expand the porous section, such as with a balloon that is later removed.

If desired, the insert can include a netting or screen 32 supported by the ribs. In one embodiment, the netting or screen has a mesh size of less than 20 mesh.

The insert is preferably used in combination with a bottle 34. The bottle has a neck 36 and a main body 38. The neck terminates in an annular sealing surface 40. The neck has an inside surface contacting an outside surface of the imperforate section of the insert. The sealing surface of the neck sealingly contacts the radially outwardly extending annular flange of the insert.

The porous section of the insert is inside of the main body of the bottle and the porous section is expanded to a larger diameter than the imperforate section. An annular volume 42, 142 is defined between the porous section of the insert and the main body of the bottle.

A mixture of plant matter and beverage is in the volume. The plant matter for example, can comprise fruit chunks 44, or crushed fruit, vegetable chunks 46, or pureed vegetables, a herb 48, a spice 50, or whole fruit 52. The porous section of the insert contains a filtrate 54 of the mixture without substantial solid plant matter.

Figure 4:
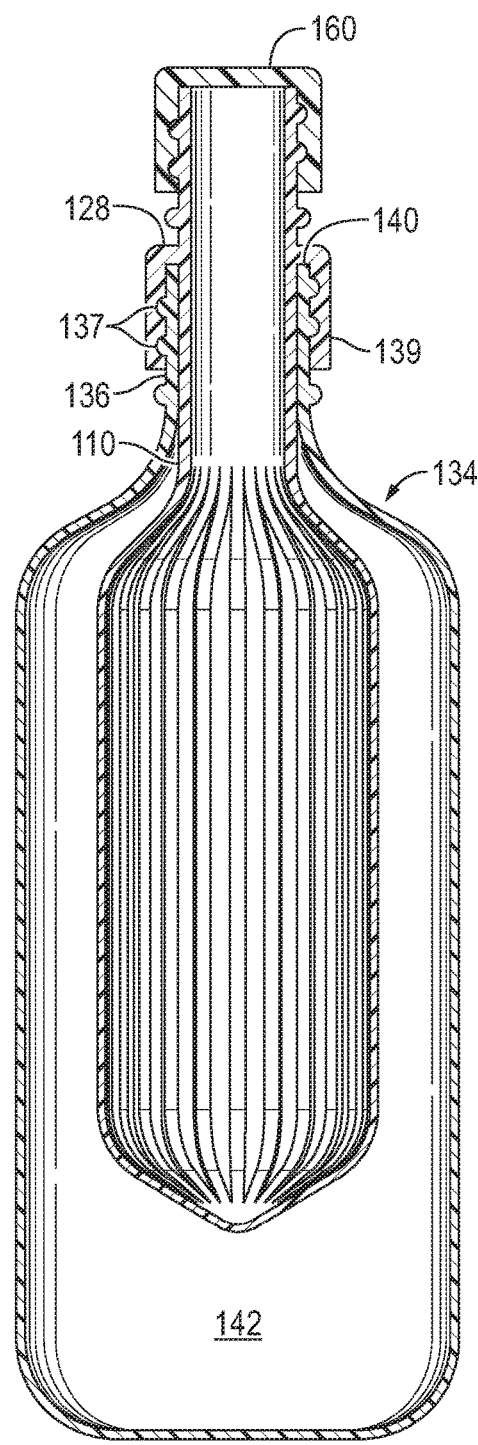
FIG. 4 is a cross-sectional view of another embodiment of the invention in a completed state.

In the embodiment of the invention shown in FIG. 4, the neck 136 of the bottle 134 is externally threaded at 137 and a threaded collar 139 depends from the radially extending annular flange 128 of the insert. The collar 139 engages the externally threaded neck of the bottle to urge the radially extending flange of the insert against the annular sealing surface 140 of the bottle. The neck is sealed by cap 160.

Figure 3:
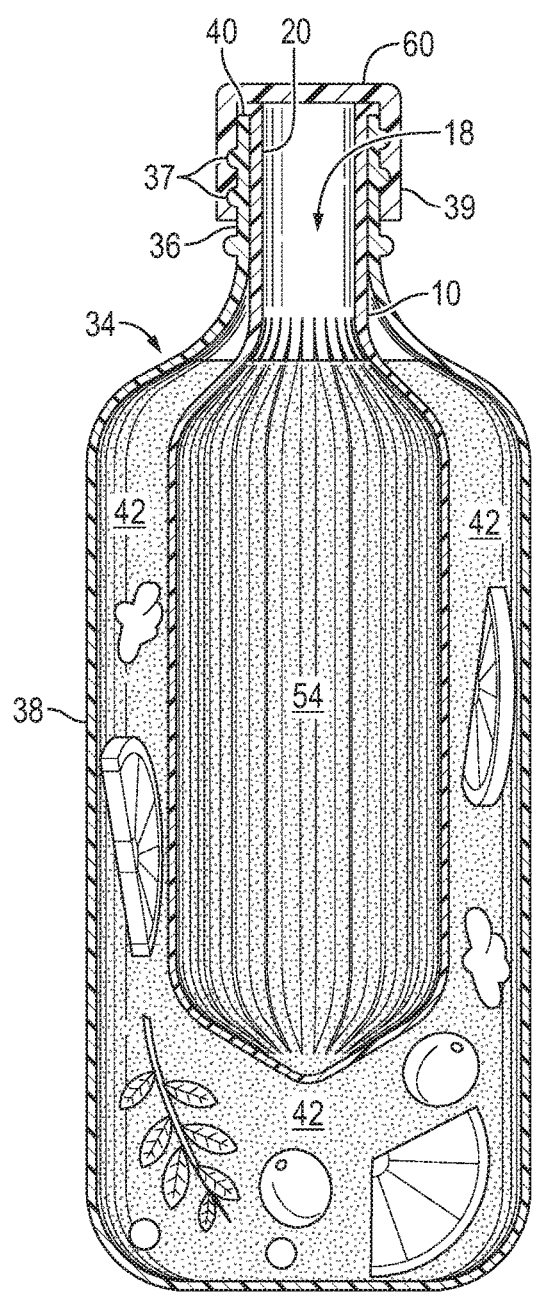
FIG. 3 is a cross-sectional view of the embodiment of the invention shown in FIG. 1 in a completed state.

In the embodiment of the invention shown in FIG. 3, the neck 36 of the bottle is externally threaded at 37. A cap 60 for the bottle is provided having a depending collar 39 with internal threads engaging the external threads on the bottle and urging the radially extending flange of the insert against the annular sealing surface 40 of the bottle.

A preferred embodiment of the invention provides a bottle assembly comprising a plastic bottle, an insert, a mixture of beverage and plant matter, and a solution of beverage and plant matter extracts.

The bottle is preferably made from thin-walled plastic, preferably transparent plastic. More preferably, the bottle is constructed to be disposable or for single-use. The bottle is preferably sized to have a volume in the range of 0.4 L to 0.8 L, and for this size bottle, PET will provide good results. For larger sized bottle, polycarbonate is expected to provide better results. In preferred embodiments, the plastic bottle has a volume in the range of 0.4 L to 0.7 L or in the range of 0.5 L to 0.7 L. The bottle defines a neck and a main body. The neck has an inside diameter generally in the range of 20 to 35 mm which terminates in an annular sealing surface. The main body of the bottle has a larger inside diameter than the neck.

The insert extends into the bottle. The insert has a tubular imperforate section positioned in the neck of the bottle and a porous section positioned in the main body of the bottle. Preferably, the imperforate section fits tightly in the neck and in one embodiment is not non-destructively removable. In the illustrated embodiment, the porosity is provided by longitudinally extending slits, but it could alternatively be provided by apertures, or made more effective for filtration by a screen or mesh covering. The insert defines an annular flange on an exterior of the imperforate section sealingly positioned against the annular sealing surface of the bottle. A chamber of annular cross section is defined between the porous section of the insert and the main body of the bottle. A mixture of beverage and plant matter is in the chamber, and a solution of beverage and plant matter extracts from the plant matter is in the insert. The insert has an open upper end in flow communication with the solution of beverage and extracts in the insert for consumption by users. For sale and long-term stability, the assembly further comprises a cap forming a seal against the open end of the insert.

Another embodiment of the invention provides a method for preparing a a plant matter flavored beverage for later consumption. The method comprises inserting plant matter into a bottle through the neck of the bottle, inserting a generally tubular strainer into the bottle which has a flange that sealingly abuts against the neck of the bottle. An annulus is formed between the insert and the wall of the bottle that contains the plant matter. The bottle is filled with a water-based liquid capped for transportation and later consumption. The strainer substantially isolates chunks of plant matter, which can be selected from a fruit portion, a vegetable portion, a herb portion, and a spice portion from the inside of the strainer.

While certain preferred embodiments have been described herein, the invention is not to be construed as being so limited, except to the extent that such limitations are found in the claims.

What is claimed is:

1. Apparatus comprising:
an elongated insert for a bottle, said elongated insert having a first end, a second end, and a longitudinal axis extending between the first end and the second end, said elongated insert having a hollow inside and an axially directed opening at the first end communicating with the hollow inside, said elongated insert having a porous section establishing a multiplicity of lateral flow paths into the hollow inside and an imperforate section between the porous section and the first end, the porous section being generally cylindrical and having a larger diameter than the imperforate section when the elongated insert is in an expanded state and the porous section having a same diameter as the imperforate section when the elongated insert is in a collapsed state,
wherein the imperforate section of the elongated insert is generally tubular and defines a radially outwardly extending annular flange,
wherein the porous section comprises a multiplicity of ribs extending generally alongside each other, the lateral flow paths being defined between the ribs, said apparatus
further comprising, in combination, the bottle, said bottle having a neck and a main body, said neck terminating in an annular sealing surface, said neck having an inside surface contacting an outside surface of the imperforate section of the elongated insert, the sealing surface of the neck sealingly contacting the radially outwardly extending annular flange of the elongated insert.

2. The apparatus combination as in claim 1 wherein the porous section of the elongated insert is inside of the main body of the bottle and the porous section is molded to a larger diameter than the imperforate section, an annular volume being defined between the porous section of the elongated insert and the main body of the bottle.

3. The apparatus combination as in claim 2 further comprising a mixture of plant matter and beverage in the annular volume.

4. The apparatus combination as in claim 3 wherein the porous section of the elongated insert contains a filtrate of the mixture without substantial solid plant matter.

5. The apparatus combination as in claim 1 wherein the neck of the bottle is externally threaded and a threaded collar depends from the radially extending annular flange of the elongated insert, said threaded collar engaging the externally threaded neck of the bottle to urge the radially extending flange of the elongated insert against the annular sealing surface of the bottle.

6. The apparatus combination as in claim 1 wherein the neck of the bottle is externally threaded, said combination further comprising a cap with internal threads engaging the external threads on the bottle and urging the radially extending annular flange of the elongated insert against the annular sealing surface of the bottle.

7. A bottle assembly comprising
a plastic bottle having a volume in the range of 0.4 L to 0.8 L, said plastic bottle defining a neck having an inside diameter in the range of 20 to 35 mm terminating in an annular sealing surface and a main body having a larger inside diameter than the neck;
an elongated insert extending into said plastic bottle, said elongated insert having a tubular imperforate section positioned in the neck of the plastic bottle and a porous section positioned in the main body of the plastic bottle,
the porous section being generally cylindrical and having a larger diameter than the tubular imperforate section when the elongated insert is in an expanded state and the porous section having a same diameter as the tubular imperforate section when the elongated insert is in a collapsed state,
said elongated insert defining an annular flange on an exterior of the tubular imperforate section sealingly positioned against the annular sealing surface of the plastic bottle, a chamber of annular cross section defined between the porous section of the elongated insert and the main body of the plastic bottle;
a mixture of beverage and plant matter in the chamber, and
a solution of beverage and plant matter extracts from the plant matter in the elongated insert.

8. A The bottle assembly as in claim 7
wherein the elongated insert has an open upper end in flow communication with the solution of beverage and plant matter extracts in the elongated insert, said assembly further comprising a cap forming a seal against the open upper end of the elongated insert.

* * * * *